United States Patent
Yajima et al.

(10) Patent No.: US 9,942,123 B2
(45) Date of Patent: Apr. 10, 2018

(54) DEVICE AND METHOD FOR MONITORING COMMUNICATION IN NETWORK INCLUDING A PLURALITY OF NODES

(71) Applicant: FUJITSU LIMITED, Kawasaki-shi, Kanagawa (JP)

(72) Inventors: Jun Yajima, Kawasaki (JP); Takayuki Hasebe, Kawasaki (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 15/060,680

(22) Filed: Mar. 4, 2016

(65) Prior Publication Data
US 2016/0269265 A1    Sep. 15, 2016

(30) Foreign Application Priority Data
Mar. 13, 2015 (JP) ................. 2015-050792

(51) Int. Cl.
*H04L 12/26* (2006.01)
*H04L 12/40* (2006.01)

(52) U.S. Cl.
CPC ........ *H04L 43/12* (2013.01); *H04L 12/40169* (2013.01); *H04L 2012/40215* (2013.01); *H04L 2012/40273* (2013.01)

(58) Field of Classification Search
CPC ........... H04L 2012/40215; H04L 12/40; H04L 67/12; H04L 63/08; H04L 63/123; H04L 63/1441; H04L 63/1466; H04L 1/0061; H04L 41/0677; H04L 61/6027; H04L 9/3242
See application file for complete search history.

(56) References Cited

U.S. PATENT DOCUMENTS

| | | | |
|---|---|---|---|
| 2003/0115485 A1* | 6/2003 | Milliken | G06F 21/562 726/24 |
| 2010/0188972 A1 | 7/2010 | Knapp | |
| 2011/0149746 A1 | 6/2011 | Kang et al. | |
| 2013/0139018 A1* | 5/2013 | Takada | H04L 12/407 714/748 |

FOREIGN PATENT DOCUMENTS

| | | |
|---|---|---|
| EP | 2187569 A1 | 5/2010 |
| JP | 2006-148594 | 6/2006 |

OTHER PUBLICATIONS

Extended European Search Report dated Jul. 14, 2016 for corresponding European Patent Application No. 16158680.5, 7 pages.

* cited by examiner

*Primary Examiner* — Awet Haile
(74) *Attorney, Agent, or Firm* — Fujitsu Patent Center

(57) ABSTRACT

A communication monitoring device is used in a network that includes a plurality of nodes. The communication monitoring device includes: a plurality of ports; and a processor. The processor is configured to execute a procedure including: detecting an abnormal frame from among received frames, a first arrival port at which the abnormal frame has arrived, and an order in which the abnormal frame arrived in received frames that have arrived at any of the plurality of ports, and transmitting order information that indicates the detected order to a node connected to the first arrival port.

5 Claims, 16 Drawing Sheets

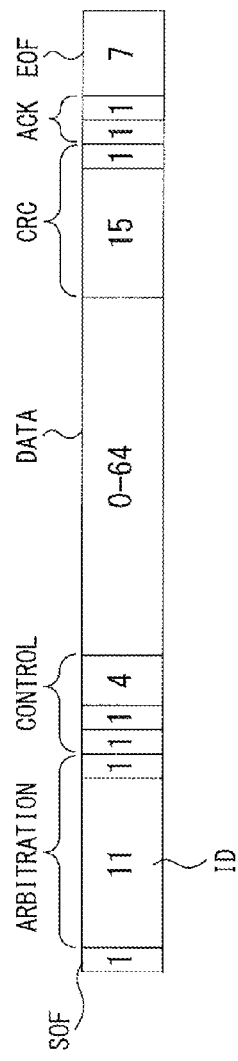
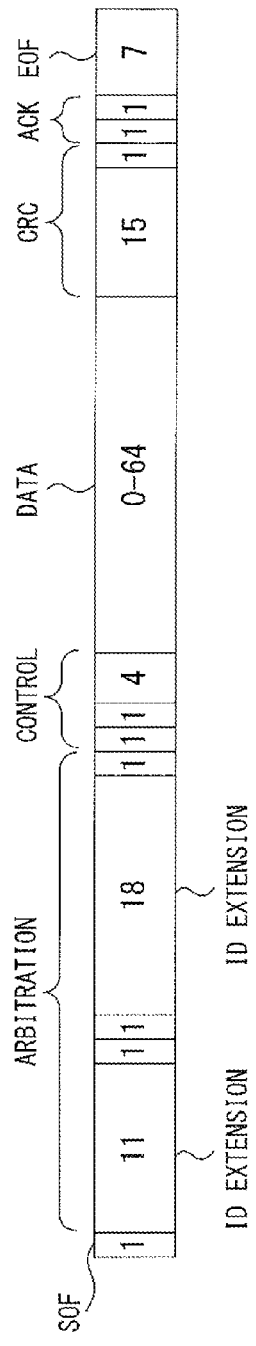
FIG. 2A
FIG. 2B

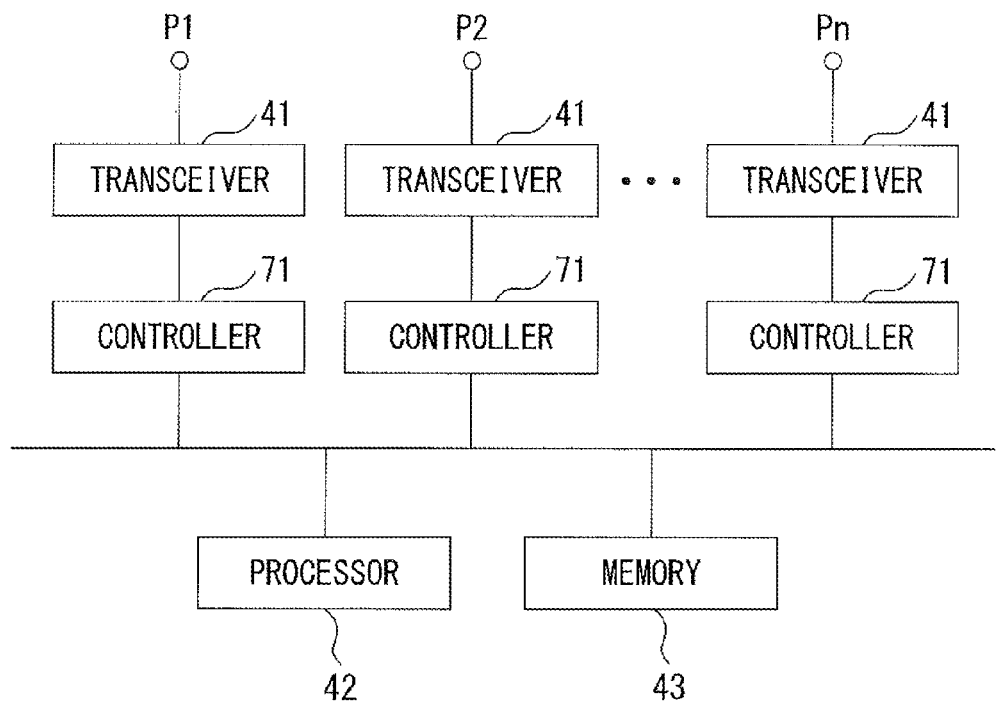
F I G. 7

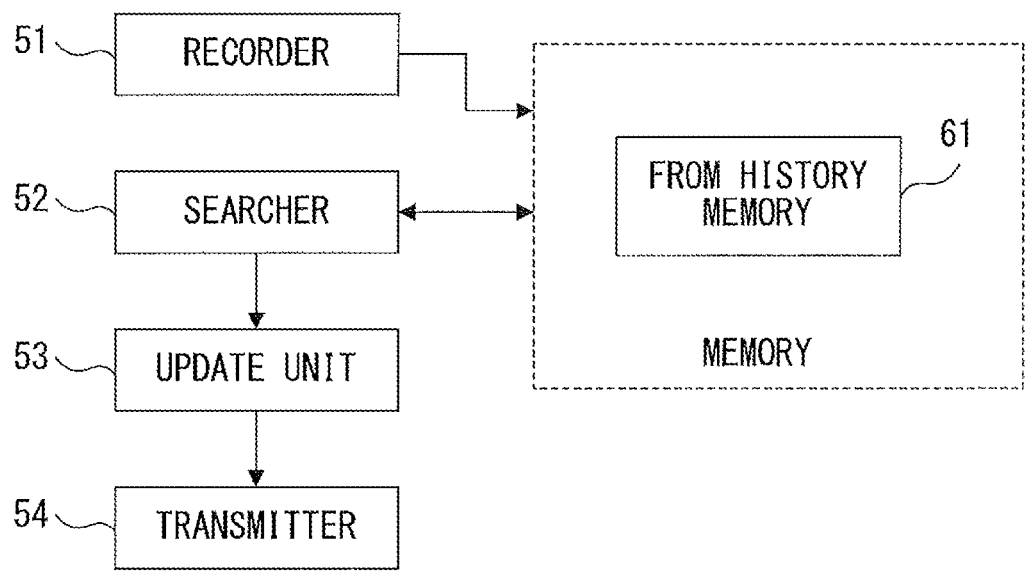
F I G. 9

FIG. 10A

| ID | ORDER INFORMATION | GW | FIRST STAGE HUB | SECOND STAGE HUB | ... | nTH STAGE HUB |
|---|---|---|---|---|---|---|
| 0x777 | -1 | 0x001 | 0xFFF | 0xFFF | ... | 0xFFF |

DATA

FIG. 10B

| 0x777 | -1 | 0x001 | 0x004 | 0xFFF | ... | 0xFFF |

FIG. 10C

| 0x777 | -1 | 0x001 | 0x004 | 0x002 | ... | 0xFFF |

DEVICE AND METHOD FOR MONITORING COMMUNICATION IN NETWORK INCLUDING A PLURALITY OF NODES

CROSS-REFERENCE TO RELATED APPLICATION

This application is based upon and claims the benefit of priority of the prior Japanese Patent Application No. 2015-050792, filed on Mar. 13, 2015, the entire contents of which are incorporated herein by reference.

FIELD

The embodiments discussed herein are related to a device and a method for monitoring communication in a network that includes a plurality of nodes.

BACKGROUND

In recent years, automobiles are equipped with various electronic devices for performing various electronic controls. These electronic devices are connected to one another through a network. CAN (controller area network) has become widespread as one of the network protocols established in an automobile.

In a network configured by CAN, a plurality of ECUs (electronic control unit) perform communication through a HUB node. The HUB node may operate as a relay node. Further, in the CAN system, a data frame transmitted from one ECU is received by all other ECUs. In other words, the CAN system provides broadcast communication. According to an ID added to a received data frame, each ECU obtains a necessary data frame and discards an unnecessary data frame.

In the CAN network having the above-described configuration, a function that detects an abnormal frame may be requested. In this case, the CAN network has a communication monitoring device. The communication monitoring device may be implemented by a gateway device. The gateway device may connect CAN to other networks (for example, the Internet). In the following description, it is assumed that the gateway device has a function that detects an abnormal frame.

As described above, the CAN system provides broadcast communication. Thus, the gateway device can receive all frames that are broadcasted in the network. Then, the gateway device detects an abnormal frame by analyzing each of the received frames. Preferably, the gateway device can identify a source node of the detected abnormal frame.

As a related technology, a transmission source tracking system that tracks a transmission source of a packet in a network including a plurality of relay devices has been proposed (for example, Japanese Laid-open Patent Publication No. 2006-148594).

According to CAN, a method for identifying an ECU that is a source node of an abnormal frame is not definitively determined. Further, information that identifies a source node (for example, a source address) is not added to a frame that is transmitted in the CAN system. Thus, it is difficult for a gateway device to identify an ECU that is a source node of an abnormal frame when the abnormal frame is detected.

Even in a network in which information that identifies a source node is not added to a transmitted frame, the gateway device may be able to identify a source node of an abnormal frame if each relay node stores related information of all forwarded frames. However, in this configuration, each of the relay nodes has to be provided with a large-capacity memory.

Note that this problem occurs not only in the CAN system, but it may also occur in a network in which information that identifies a source node is not added to a transmitted frame.

SUMMARY

According to an aspect of the embodiments, a communication monitoring device is used in a network that includes a plurality of nodes. The communication monitoring device includes: a plurality of ports; and a processor. The processor is configured to execute a procedure including: detecting an abnormal frame from among received frames, a first arrival port at which the abnormal frame has arrived, and an order in which the abnormal frame arrived in received frames that have arrived at any of the plurality of ports, and transmitting order information that indicates the detected order to a node connected to the first arrival port.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A and 2B illustrate structures of a data frame used in CAN;

FIG. 7 illustrates an example of a hardware configuration of a gateway device;

FIG. 9 illustrates functions of a hub device;

FIGS. 10A-10C illustrate examples of a generation and an update of a search frame;

DESCRIPTION OF EMBODIMENTS

Figure 1:
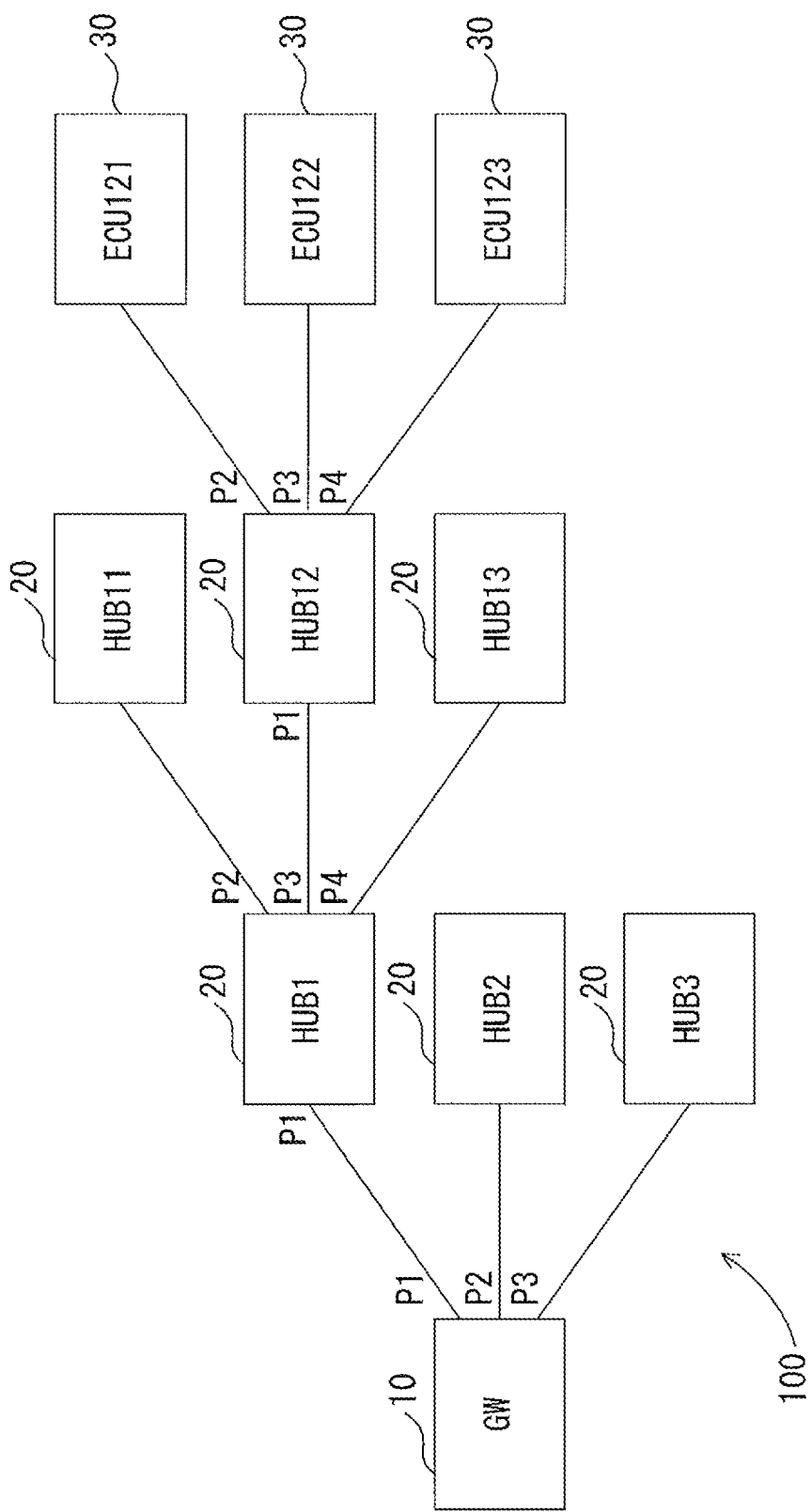
FIG. 1 illustrates an example of a network according to embodiments of the present invention.

FIG. 1 illustrates an example of a network according to embodiments of the present invention. As illustrated in FIG.

1, a network 100 of the embodiments includes a gateway device 10, a plurality of hub devices 20, and a plurality of terminal devices 30.

The gateway device 10 can connect the network 100 to other networks (for example, the Internet). Further, the gateway device 10 has a function that detects an abnormal frame from among the data frames transmitted in the network 100. The function that detects an abnormal frame will be described below.

A terminal device 30 broadcasts a data frame in a network. Further, the terminal device 30 can receive a data frame transmitted from another terminal device 30.

Information that identifies a source node of a data frame and information that identifies a destination node of the data frame are not added to the data frame transmitted in the network 100. The terminal device 30 may be implemented by an ECU (electronic control unit). ECUs 121-123 are illustrated in FIG. 1, but the network 100 may include other terminal devices 30.

The hub device 20 operates as a relay node, and forwards a data frame that is transmitted from a terminal device 30, to other terminal devices 30 in the network 100. In other words, the data frame is broadcasted in the network 100. HUBs 1-3 and HUBs 11-3 are illustrated in FIG. 1, but the network 100 may include other hub devices 20.

A plurality of hub devices 20 are hierarchically connected with respect to the gateway device 10. In the example of FIG. 1, the HUBs 1-3 are connected to the gateway device 10, and the HUBs 11-13 are connected to the HUB 1. In other words, the HUBs 1-3 are arranged in a first stage with respect to the gateway device 10. The HUBs 11-13 are arranged in a second stage with respect to the gateway device 10.

The gateway device 10 and the hub devices 20 respectively have a plurality of ports. In the example of FIG. 1, the gateway device 10 has ports P1-P3. Further, the HUBs 1-3 are respectively connected to the ports P1-P3 of the gateway device 10. The HUB 1 has ports P1-P4. The gateway device 10 is connected to the port P1 of the HUB 1, and the HUBs 11-13 are respectively connected to the ports P2-P4 of the HUB 1. The HUB 12 has ports P1P4. The HUB 1 is connected to the port P1 of the HUB 12, and the ECUs 121-123 are respectively connected to the ports P2-P4 of the HUB 12. Likewise, the other hub devices 20 respectively have a plurality of ports.

The network 100 may be implemented by CAN (controller area network). CAN has become widespread as one of the networks established in an automobile.

FIG. 2A illustrates a structure of a data frame used in CAN. The data frame used in CAN includes an SOF (start of frame), Arbitration, Control, Data, CRC, ACK, and an EOF (end of frame). In this structure, ID information is stored in the arbitration field. In CAN, an extended configuration illustrated in FIG. 2B is specified in addition to a standard configuration illustrated in FIG. 2A. Further, a next generation standard that is called CANFD is also discussed.

In the network 100 illustrated in FIG. 1, a data frame transmitted from a terminal device 30 is broadcasted to all terminal devices 30 through hub devices 20. In this case, the data frame is also transmitted to the gateway device 10.

An ID of CAN indicates a content of a data frame and also serves as information on a source node and information on a destination node. For example, when CAN is used in an automobile, a specified ID (for example, ID=0x123) indicates an accelerator position and is "to be transmitted from an accelerator pedal ECU to an engine control ECU". The data frame is broadcasted to all terminal devices 30 through the hub devices 20. Each of the terminal devices 30 obtains a necessary data frame and discards (or ignores) an unnecessary data frame according to an ID of a received data frame. For example, when a data frame with ID=0x123 is broadcasted in the CAN system, the engine control ECU obtains the data frame and other ECUs discard the data frame. An ID of a data frame that is to be received by each terminal device 30 is determined in advance, and is reported to or stored in the terminal device 30. Further, communication in the CAN system is not necessarily one-to-one, and it may be one-to-many.

The gateway device 10 can detect an abnormal frame from among the data frames transmitted in the network 100. For example, it is assumed that, in FIG. 3, a data frame transmitted from the ECU 121 is abnormal. In other words, the ECU 121 transmits an abnormal frame. This abnormal frame is broadcasted and thus arrives at the gateway device 10. Here, for example, when an ID of a received frame has a value that is not specified in advance, the gateway device 10 may determine that the received frame is an abnormal frame.

Figure 3:
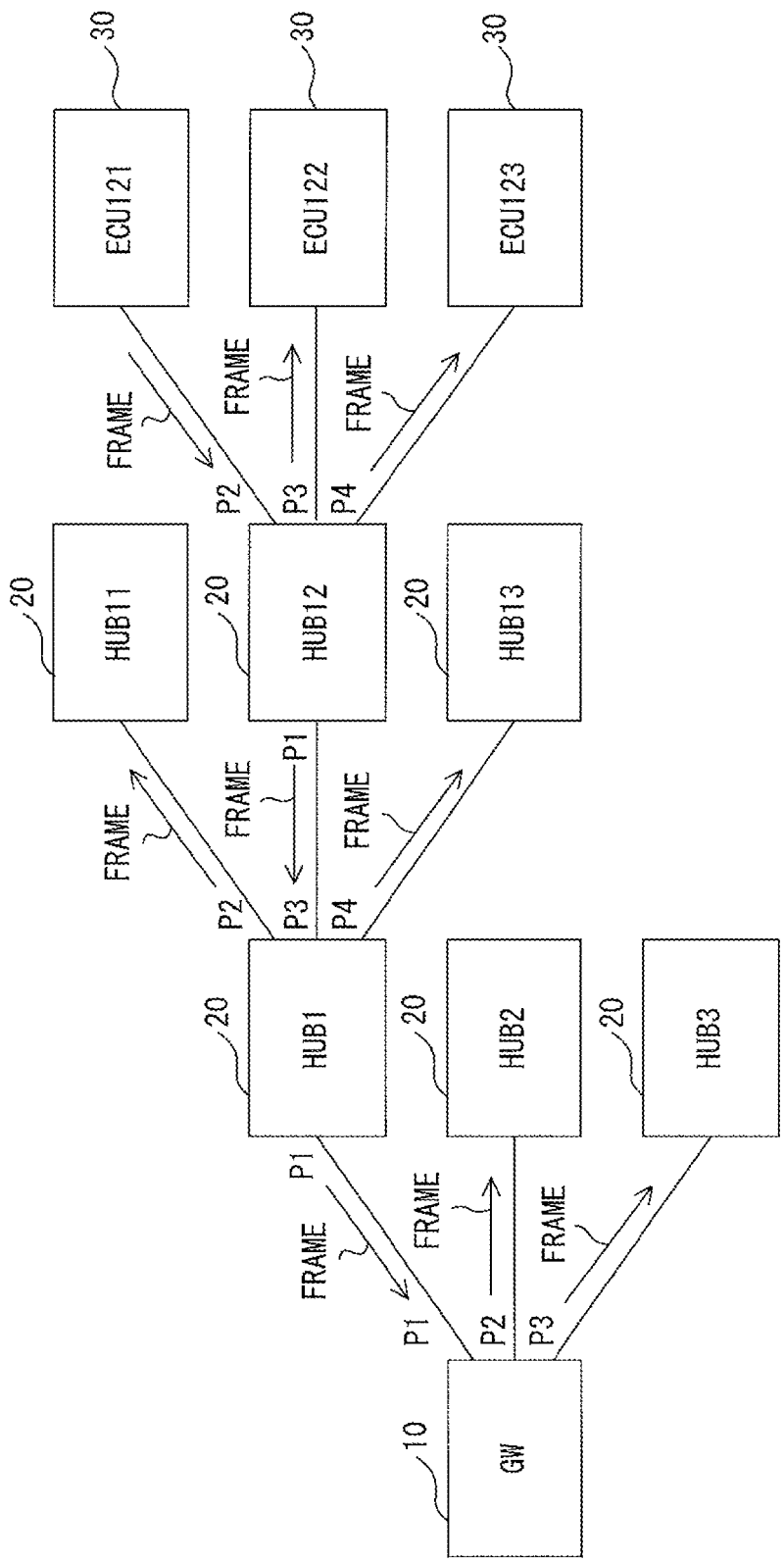
FIG. 3 illustrates an example of a broadcast of a data frame.

However, information that directly identifies a source node is not attached to a data frame transmitted in the network 100. In addition, even if ID information that corresponds to a source node is attached to the data frame, when an error occurs in the ID information due to a failure or an attack or when a data portion becomes abnormal, the gateway device 10 is not able to identify the source node of the frame. In other words, in the example of FIG. 3, the gateway device 10 is not able to identify the ECU that transmitted the abnormal frame from among the ECUs 121-123 according to the information stored in the received abnormal frame. However, the gateway device 10 can identify a port at which the abnormal frame has arrived. In the example of FIG. 3, the gateway device 10 can decides that the port at which the abnormal frame has arrived is P1.

In the network 100 having the above-described configuration, it is preferable that the gateway device 10 can identify a source node of a detected abnormal frame. A method for identifying a source node of an abnormal frame will be discussed below.

Figure 4:
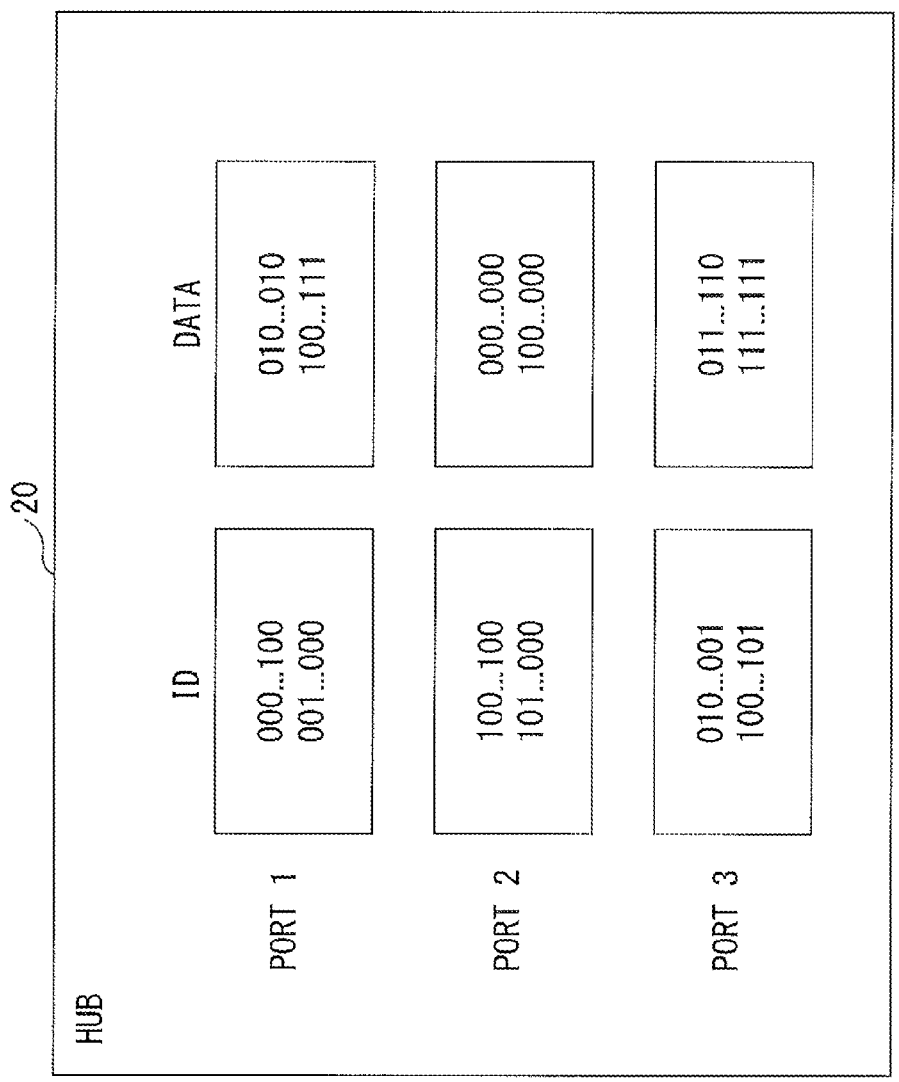
FIG. 4 illustrates an example of a method for identifying a source node of an abnormal frame.

In the example of FIG. 4, each hub device 20 records therein a communications log for each port. For example, an ID and data of each received frame are recorded in a communications log memory of the hub device 20.

When the gateway device 10 detects an abnormal frame and identifies a port at which the abnormal frame has arrived, the gateway device 10 transmits an inquiry message frame to a node connected to the identified port. The inquiry message frame includes an ID and data of the detected abnormal frame, and inquires about a source node of the abnormal frame. In the example of FIG. 3, the gateway device 10 transmits an inquiry message frame to the HUB 1. Then, the inquiry message frame transmitted from the gateway device 10 to the HUB 1 is broadcasted to each hub device 20 under the HUB 1.

Each of the hub devices 20 that receives the inquiry message frame searches in its own communications log memory using a set of the ID and the data included in the inquiry message frame, and identifies a corresponding port. In the example of FIG. 3, the port P3 is identified in the HUB 1, and the port P3 is identified in the HUB 12. Then, the HUB 1 and the HUB 12 respectively report the identified port to the gateway device 10. The gateway device 10 can identify the source node of the abnormal frame according to the reports received from the HUB 1 and the HUB 12. In this example, the terminal device 30 connected to the port P3 of the HUB 12 (that is, the ECU 122) is decided to be the source node of the abnormal frame.

Accordingly, the gateway device 10 can identify a source node of an abnormal frame. However, when identifying a source node of an abnormal frame using the method illustrated in FIG. 4, each hub device 20 records therein a communications log for each port. Thus, the hub device 20 has to have a large-capacity memory. For example, it is assumed that an ID is 11 bits and data is 64 bits. Further, it is assumed that the hub device 20 has four ports. Furthermore, it is assumed that a communications log records therein up to one thousand received frames for each port. In this case, the size of a memory for the communications login the hub device 20 is 300000 bits.

Figure 5:
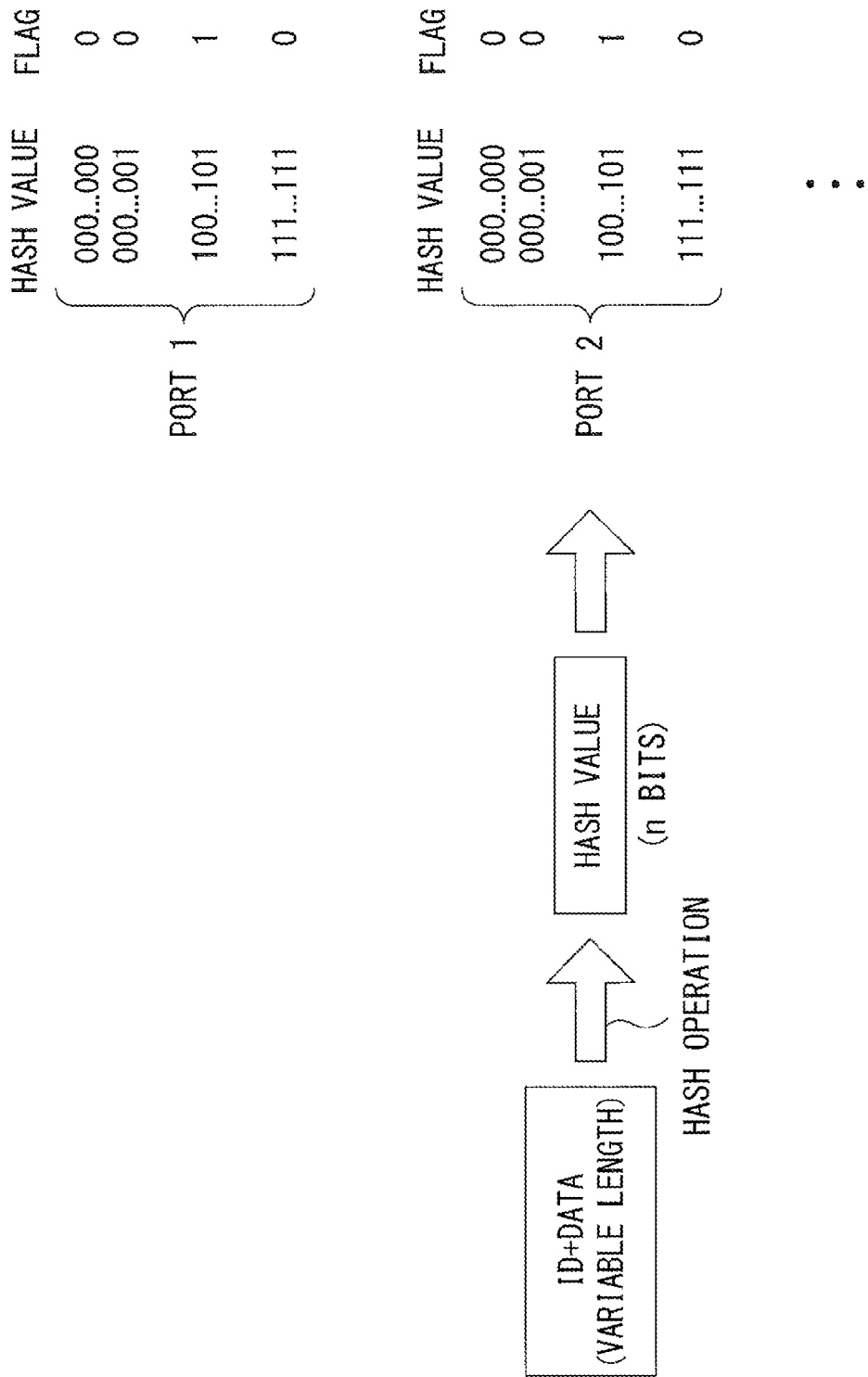
FIG. 5 illustrates another example of a method for identifying a source node of an abnormal frame.

In the example of FIG. 5, a source node of an abnormal frame is identified by use of a hash function. Note that the method of FIG. 5 is similar to that of FIG. 4. In the method of FIG. 4, an ID and data of a received frame is recorded in each hub device 20. On the other hand, in the method of FIG. 5, a hash value corresponding to a set of an ID and data of a received frame is recorded in each hub device 20. Here, when an n-bit hash value is generated, each hub device 20 has a $2^n$-bit memory for each port. A flag illustrated in FIG. 5 identifies a record that corresponds to a data frame that passed in the past.

Compared with the method of FIG. 4, the size of a memory for recording a communications log can be made smaller in the method of FIG. 5. However, a hardware circuit for performing a hash operation in each hub device 20 is needed, and a processing time for the hash operation is also needed.

First Embodiment

Figure 6:
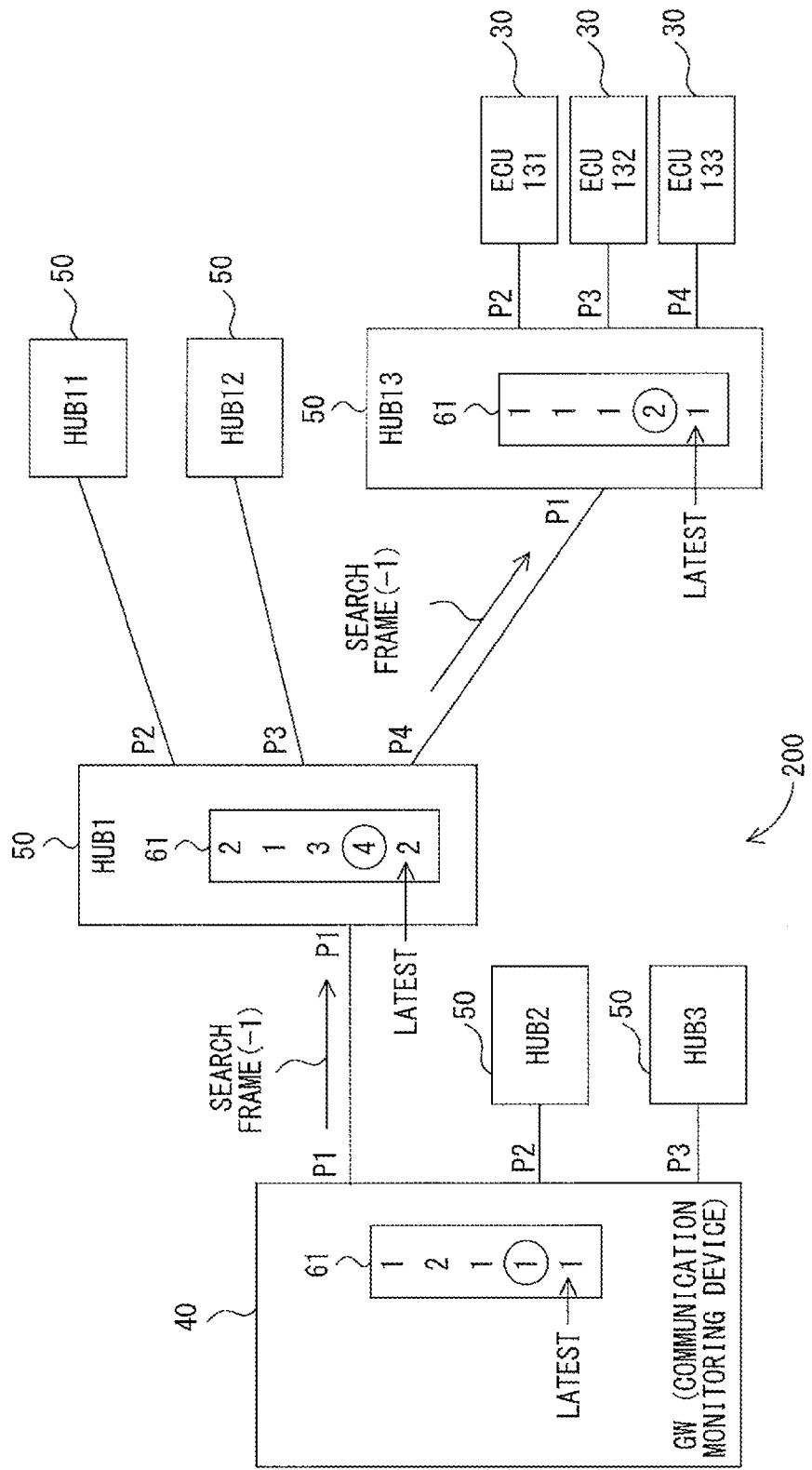
FIG. 6 illustrates an example of a communication monitoring method according to a first embodiment.

FIG. 6 illustrates an example of a communication monitoring method according to a first embodiment of the present invention. As illustrated in FIG. 6, a network 200 of the first embodiment includes a gateway device 40, a plurality of hub devices 50, and a plurality of terminal devices 30.

The network 200 is implemented by, for example, CAN (controller area network). In this case, the frame illustrated in FIG. 2A or 2B is transmitted in the network 200. A data frame transmitted from a terminal device 30 is broadcasted to all terminal devices 30 in the network 200.

The gateway device 40 can connect the network 200 to other networks (for example, the Internet). Further, the gateway device 40 has a function that detects an abnormal frame from among the data frames transmitted in the network 200. For example, when an ID of a received frame has a value that is not specified in advance, the gateway device 40 decides that the received frame is an abnormal frame. Further, the gateway device 40 can also decides whether the received frame is an abnormal frame by use of a CRC. Furthermore, the gateway device 40 may detect an abnormal frame by other methods.

The terminal device 30 is substantially the same in FIGS. 1 and 6. In other words, a terminal device 30 can transmit a data frame to another terminal device 30 and can receive a data frame transmitted from another terminal device 30. Information that directly identifies a source node of a data frame and information that directly identifies a destination node of the data frame are not added to the data frame transmitted in the network 200. The terminal device 30 is realized by, for example, an ECU (electronic control unit). ECUs 131-133 are illustrated in FIG. 6, but the network 200 may include other terminal devices 30.

The hub device 50 operates as a relay node, and forwards a data frame transmitted from a terminal device 30 to all terminal devices 30 in the network 200. In other words, the data frame is broadcasted in the network 200. HUBs 1-3 and HUBs 11-13 are illustrated in FIG. 6, but the network 200 may include other hub devices 50.

A plurality of hub devices 50 are hierarchically connected with respect to the gateway device 40. In the example of FIG. 6, the HUBs 1-3 are connected to the gateway device 40, and the HUBs 11-13 are connected to the HUB 1. In other words, the HUBs 1-3 are arranged in a first stage with respect to the gateway device 40. The HUBs 11-13 are arranged in a second stage with respect to the gateway device 40.

The gateway device 40 and the hub devices 50 respectively have a plurality of ports. In the example of FIG. 6, the gateway device 40 has ports P1-P3. The HUBs 1-3 are respectively connected to the ports P1-P3 of the gateway device 40. The HUB 1 has ports P1-P4. The gateway device 40 is connected to the port P1 of the HUB 1, and the HUBs 11-13 are respectively connected to the ports P2-P4 of the HUB 1. The HUB 13 has ports P1-P4. The HUB 1 is connected to the port P1 of the HUB 13, and the ECUs 131-133 are respectively connected to the ports P2-P4 of the HUB 13. Likewise, the other hub devices 50 respectively have a plurality of ports.

The gateway device 40 and the hub devices 50 respectively have a From history memory 61. The From history memory 61 records therein, in order of arrival, arrival port numbers indicating ports at which data frames have arrived.

In the example of FIG. 6, a first data frame F1 is transmitted from an ECU (not shown) that is accommodated by the HUB 11. The data frame F1 is transmitted from the HUB 11 to the HUB 1, and arrives at the port P2 of the HUB 1. Thus, "2" is recorded in a first record in the From history memory 61 of the HUB 1.

The HUB 1 broadcasts the data frame F1 received from the HUB 11. In this case, the data frame F1 transmitted from the port P1 of the HUB 1 arrives at the port P1 of the gateway device 40. Thus, "1" is recorded in a first record in the From history memory 61 of the gateway device 40. Further, the data frame F1 transmitted from the port P4 of the HUB 1 arrives at the port P1 of the HUB 13. Thus, "1" is recorded in a first record in the From history memory 61 of the HUB 13.

Next, a second data frame F2 is transmitted from an ECU (not shown) that is accommodated by the HUB 2. The data frame F2 is transmitted from the HUB 2 to the gateway device 40, and arrives at the port P2 of the gateway device 40. Thus, "2" is recorded in a second record in the From history memory 61 of the gateway device 40.

The gateway device 40 broadcasts the data frame F2 received from the HUB 2. In this case, the data frame F2 transmitted from the port P1 of the gateway device 40 arrives at the port P1 of the HUB 1. Thus, "1" is recorded in a second record in the From history memory 61 of the HUB 1. The HUB 1 broadcasts the data frame F2 received from the gateway device 40. In this case, the data frame F2 transmitted from the port P4 of the HUB 1 arrives at the port P1 of the HUB 13. Thus, "1" is recorded in a second record in the From history memory 61 of the HUB 13.

Likewise, when a data frame is broadcasted in the network 200, the From history memories of the gateway device 40 and the hub devices 50 respectively record therein, in order of arrival, arrival port numbers indicating ports at which data frames have arrived. For example, the From history memory 61 of the gateway device 40 sequentially records therein five arrival port numbers "1", "2", "1", "1", and "1". In this case, a reception history recorded in the gateway device 40 indicates the following operations:
(1) A first data frame F1 has arrived at the port P1
(2) A second data frame F2 has arrived at the port P2
(3) A third data frame F3 has arrived at the port P1
(4) A fourth data frame F4 has arrived at the port P1
(5) A fifth data frame F5 has arrived at the port P1

The From history memory 61 of the HUB 1 sequentially records therein arrival port numbers "2", "1", "3", "4", and "2". In this case, a reception history recorded in the HUB 1 indicates the following operations:
(1) A first data frame F1 has arrived at the port P2
(2) A second data frame F2 has arrived at the port P1
(3) A third data frame F3 has arrived at the port P3
(4) A fourth data frame F4 has arrived at the port P4
(5) A fifth data frame F5 has arrived at the port P2

The From history memory 61 of the HUB 13 sequentially records therein arrival port numbers "1", "1", "1", "2", and "1". In this case, a reception history recorded in the HUB 1 indicates the following operations:
(1) A first data frame F1 has arrived at the port P1
(2) A second data frame F2 has arrived at the port P1
(3) A third data frame F3 has arrived at the port P1
(4) A fourth data frame F4 has arrived at the port P2
(5) A fifth data frame F5 has arrived at the port P1

In this case, the data frames are broadcasted in the network 200. Thus, when one data frame is broadcasted, the From history memories 61 of the gateway device 40 and the hub devices 50 respectively record therein an arrival port number that corresponds to the data frame. For example, when the data frame F1 is broadcasted, the From history memories 61 of the gateway device 40 and the hub devices 50 respectively record therein the arrival port number that corresponds to the data frame F1, and when the data frame F2 is broadcasted, the From history memories 61 of the gateway device 40 and the hub devices 50 respectively record therein the arrival port number that corresponds to the data frame F2. In other words, arrival port numbers recorded in the same records in the respective From history memories 61 are generated due to the same data frame.

According to the first embodiment, a source node of an abnormal frame is identified by use of the From history memories 61 of the gateway device 40 and each of the hub devices 50. For example, it is assumed that a fourth data frame is decided to be an abnormal frame in the gateway device 40. In this case, in a fourth record in the From history memory 61 of the gateway device 40, "arrival port number: 1" is recorded. Thus, it is decided that the abnormal frame was transmitted from a node connected to the port P1 of the gateway device 40. In other words, it is decided that the abnormal frame was transmitted from the HUB 1. In a fourth record in the From history memory 61 of the HUB 1, "arrival port number: 4" is recorded. Thus, it is decided that the abnormal frame was transmitted from a node connected to the port P4 of the HUB 1. In other words, it is decided that the abnormal frame was transmitted from the HUB 13. In a fourth record in the From history memory 61 of the HUB 13, "arrival port number: 2" is recorded. Thus, it is decided that the abnormal frame was transmitted from a node connected to the port P2 of the HUB 13. In other words, it is decided that the abnormal frame was transmitted from the ECU 131.

FIG. 7 illustrates an example of a hardware configuration of the gateway device 40. As illustrated in FIG. 7, the gateway device 40 has ports P1 to Pn, a plurality of transceivers 41, a plurality of controllers 71, a processor 42, and a memory 43. The gateway device 40 may have other circuit elements that are not illustrated in FIG. 7.

Hub devices 50 in the network 200 are respectively connected to the ports P1-Pn. In the example of FIG. 6, the HUBs 1-3 are respectively connected to the ports P1-P3. A transceiver 41 transmits a frame to the hub device 50 through a corresponding port (P1-Pn) and receives a frame from the hub device 50 through a corresponding port (P1-Pn). A controller 71 controls a corresponding transceiver 41.

The processor 42 provides a gateway function that connects the network 200 to other networks. The processor 42 further provides a function that detects an abnormal frame from among the data frames transmitted in the network 200 and a function that identifies a source node of the abnormal frame. The processor 42 can provide the above-described functions by executing a program stored in the memory 43. However, some of the above-described functions may be realized by a hardware circuit. The memory 43 can store therein the program executed by the processor 42. The From history memory 61 may be implemented by use of the memory 43.

Like the gateway device 40 of FIG. 7, the hub device 50 may have ports P1-Pn, transceivers 41, a processor 42, and a memory 43. However, a program executed in the hub device 50 is not the same as the program executed in the gateway device 40.

Figure 8:
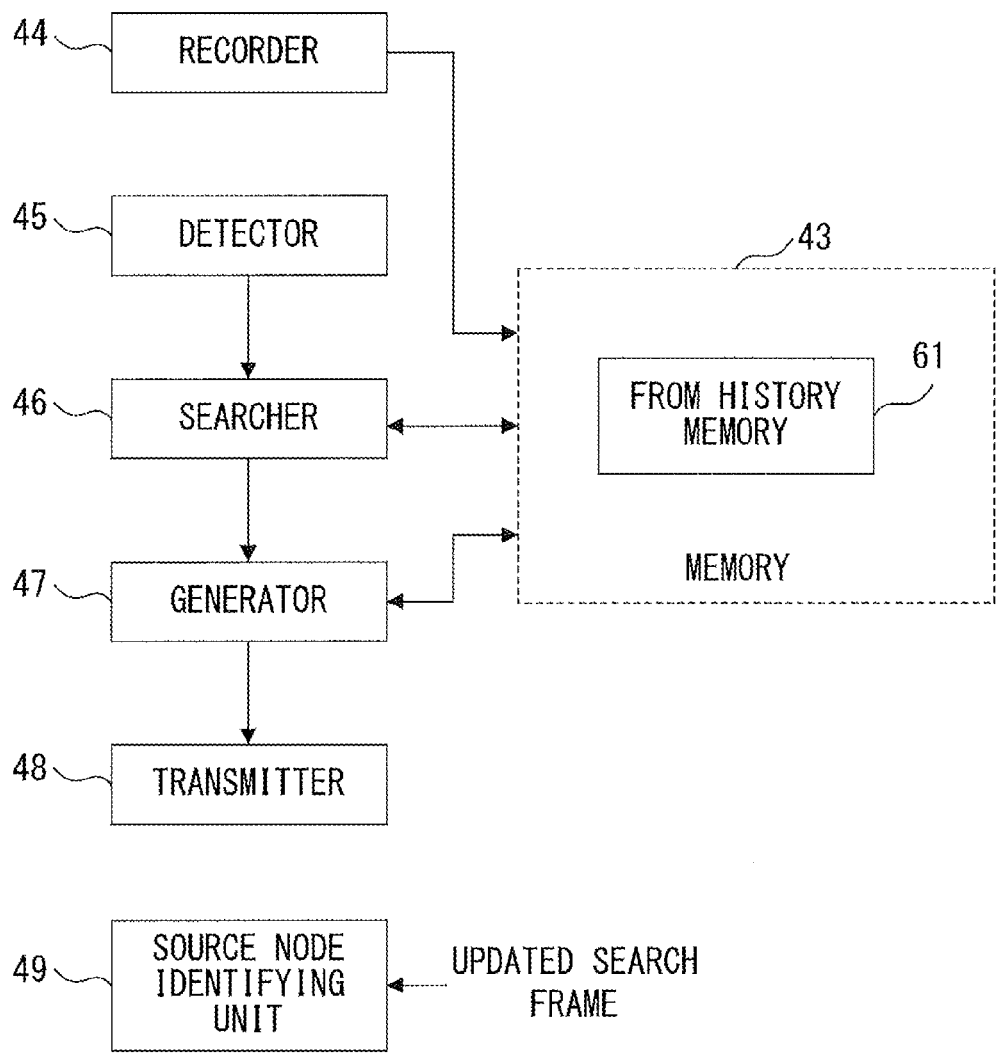
FIG. 8 illustrates functions of the gateway device.

FIG. 8 illustrates functions of the gateway device 40. As illustrated in FIG. 8, the gateway device 40 has a recorder 44, a detector 45, a searcher 46, a generator 47, a transmitter 48, and a source node identifying unit 49. The functions of the recorder 44, the detector 45, the searcher 46, the generator 47, the transmitter 48, and the source node identifying unit 49 are provided when the processor 42 executes the given program. However, some of the functions of the recorder 44, the detector 45, the searcher 46, the generator 47, the transmitter 48, and the source node identifying unit 49 may be realized by a hardware circuit.

When the gateway device 40 receives a data frame from the network 200, the recorder 44 records, in the From history memory 61, an arrival port number that indicates a port at which the data frame has arrived. The detector 45 detects an abnormal frame from among the received frames. For example, when an ID of a received frame has a value that is not specified in advance, the detector 45 decides that the received frame is an abnormal frame. The detector 45 may determine whether the received frame is an abnormal frame by use of a CRC. Furthermore, the detector 45 may detect an abnormal frame by other methods. For example, the detector 45 may decide that the received frame is an abnormal frame when a value in a data field of the received frame is outside a defined range.

When an abnormal frame is detected by the detector 45, the searcher 46 detects an order (or timing) in which the abnormal frame arrived at the gateway device 40 in the data frames that have arrived at the gateway device 40. Here, for example, the searcher 46 detects how many frames there are in the past counting from the latest data frame to the abnormal frame. In this case, in the example of FIG. 6, "order: first previous with respect to the latest data frame" is obtained. Alternatively, the searcher 46 may detect the number of data frames that have arrived between the abnormal frame and the latest data frame. Note that in some cases, the latest data frame may be decided to be an abnormal frame.

It is assumed that, according to the type of abnormalities detected, the searcher 46 can detect an order in which an abnormal frame arrived at the gateway device 40. For example, a period of time needed for detecting an abnormal frame according to an ID of a received frame, a period of time needed for detecting an abnormal frame according to a CRC operation, and a period of time needed for detecting that a value in a data field is outside a defined range are different from each other. Thus, according to each of these detection times, the searcher 46 can detect the order in which the abnormal frame arrived at the gateway device 40.

Further, the searcher 46 identifies a port at which the abnormal frame has arrived by referring to the From history memory 61. Here, the searcher 46 identifies the port at which the abnormal frame has arrived according to the order in which the abnormal frame arrived at the gateway device 40. In the example of FIG. 6, "first previous with respect to the latest data frame" is obtained. Thus, in this case, the searcher 46 obtains, from the From history memory 61, an arrival port number "1" that is recorded in a first previous position with respect to the latest arrival port number. As a result, the searcher 46 decides that the abnormal frame has arrived at the port P1.

The generator 47 generates a search frame including order information that indicates the order detected by the searcher 46. In this example, the data structure of the search frame is the same as that of the frame illustrated in FIG. 2A or 2B. However, an ID value that represents the search frame is set in the ID area of the search frame. The order information that indicates an order in which an abnormal frame arrived at the gateway device 40 is stored in a portion specified in advance in a data area (for example, the beginning of the data area).

When receiving a frame (that is, a search frame) to which an ID value representing the search frame is added, the hub device 50 performs corresponding search processing. In other words, the ID value that represents the search frame serves as a search instruction that causes the hub device 50 to perform search processing. As described above, the generator 47 generates a search frame including order information that indicates an order detected by the searcher 46 and a search instruction that instructs to search for a source node of an abnormal frame. The search processing performed by the hub device 50 will be described below.

The transmitter 48 transmits the search frame generated by the generator 47 to anode connected to the arrival port identified by the searcher 46 (that is, the port at which the abnormal frame has arrived). In the example of FIG. 6, "arrival port: P1" is identified. Thus, in this case, the gateway device 40 transmits the search frame to the HUB 1.

In FIG. 6, the number added to the "search frame" transmitted from the gateway device 40 represents order information. In this example, "first previous with respect to the latest data frame" is obtained as order information. Thus, "-1" is added to the "search frame".

The search frame is updated by the hub device 50 that received the search frame. The gateway device 40 can receive the search frame updated by the hub device 50. Then, the source node identifying unit 49 of the gateway device 40 identifies a source node of the abnormal frame according to the updated search frame.

FIG. 9 illustrates functions of the hub device 50. As illustrated in FIG. 9, the hub device 50 has a recorder 51, a searcher 52, an update unit 53, and a transmitter 54. However, some of the functions of the recorder 51, the searcher 52, the update unit 53, and the transmitter 54 may be realized by a hardware circuit.

When the hub device 50 receives a data frame, the recorder 51 records, in the From history memory 61, an arrival port number that indicates a port at which the data frame has arrived. When the hub device 50 receives a search frame, the searcher 52 obtains, from the From history memory 61, a corresponding arrival port number according to the order information stored in the search frame. For example, in the example of FIG. 6, the HUB 1 receives the search frame with "order information: −1". Then, the searcher 52 of the HUB 1 obtains an arrival port number that is one arrival port number before the latest arrival port number in the From history memory 61. In other words, "arrival port: P4" is identified in the HUB 1.

The update unit 53 adds, to the data area of the received search frame, port information that indicates an arrival port identified by the searcher 52. In the example of FIG. 6, the update unit 53 of the HUB 1 adds port information that indicates "arrival port: P4" to the data area of the search frame.

The transmitter 54 transmits the search frame updated by the update unit 53 to the gateway device 40 and a node connected to a specified arrival port. In the example of FIG. 6, the transmitter 54 of the HUB 1 transmits the updated search frame to the gateway device 40 and a node connected to the port P4 (that is, the HUB 13).

FIGS. 10A-10C illustrate examples of a generation and an update of a search frame. In this case, a search frame generated and updated in the example of FIG. 6 will be described. FIGS. 10A-10C only illustrate ID and data.

FIG. 10A illustrates a search frame generated by the gateway device 40. A dedicated ID value that represents the search frame is set in the ID area of the search frame. Order information is stored at the beginning of a data area. In this example, "first previous with respect to the latest data frame" is obtained as an order in which an abnormal frame arrived at the gateway device 40. Thus, "−1" is stored as order information. Further, port information "0x001 (P1)" that indicates a port at which the abnormal frame has arrived in the gateway device 40 is stored in the data area. Then, this search frame is transmitted from the gateway device 40 to the HUB 1.

FIG. 10B illustrates the search frame updated in the HUB 1. The HUB 1 obtains "arrival port: P4" by searching in the From history memory 61 by use of "order information: −1". Next, the update unit 53 of the HUB 1 adds port information "0x004 (P4)" to a portion for a "first stage HUB" in the data area of the search frame. Then, this search frame is transmitted to the gateway device 40 and the HUB 13.

FIG. 10C illustrates the search frame updated in the HUB 13. The HUB 13 obtains "arrival port: P2" by searching in the From history memory 61 by use of "order information: −1". Next, the update unit 53 of the HUB 13 adds port information "0x002 (P2)" to a portion for a "second stage HUB" in the data area of the search frame. Then, this search frame is transmitted to the gateway device 40 and the ECU 131. The ECU 131 discards or ignores the search frame without processing it.

The search frame transmitted from the HUB 13 to the gateway device 40 is received by the HUB 1. Here, it is assumed that the hub device 50 is configured to forward a search frame to an upstream node when receiving the search frame from a downstream node. Thus, when receiving the search frame from the HUB 13, the HUB 1 forwards the search frame through the port P1 without updating it. As a result, the search frame updated by the HUB 13 is also received by the gateway device 40.

As described above, the gateway device 40 receives the search frame updated by the HUB 1 and the search frame updated by the HUB 13. Here, it is assumed that the gateway device 40 recognizes a topology of the network 200. Thus, according to the port information stored in the search frame illustrated in FIG. 10C, the gateway device 40 can decide that the terminal device 30 that is connected to the port 2 of the HUB 13 is a source node of the abnormal frame. In other words, the ECU 131 is decided to be the source node of the abnormal frame.

Figure 11:
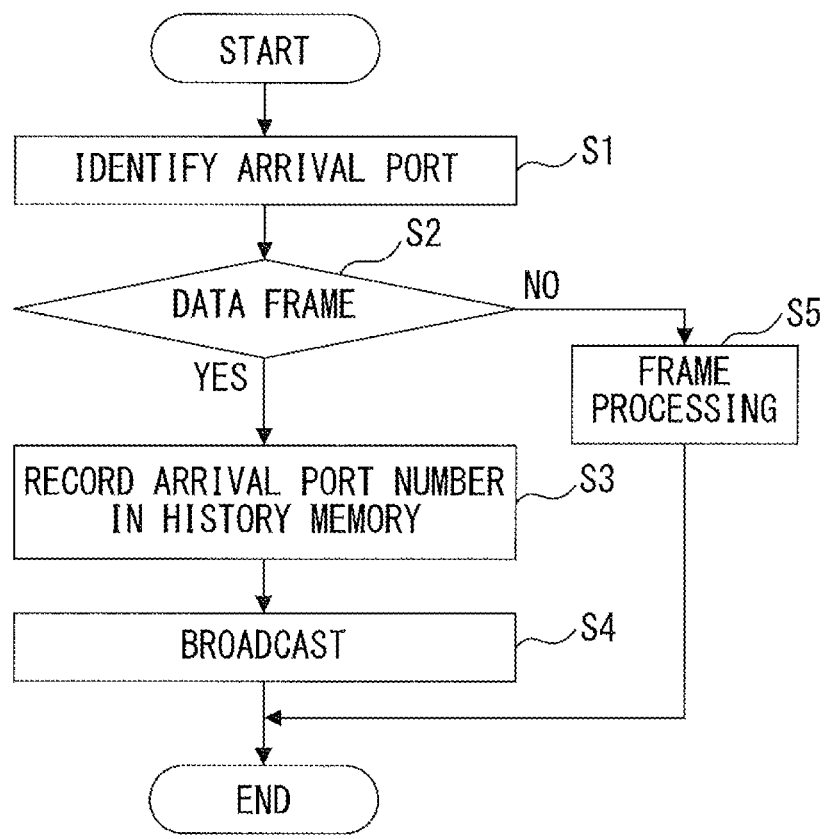
FIG. 11 is a flowchart that illustrates an operation of the hub device that receives a frame.

FIG. 11 is a flowchart that illustrates an operation of the hub device 50 that receives a frame. Processing in the flowchart is performed every time a frame arrives at the hub device 50.

Figure 12:
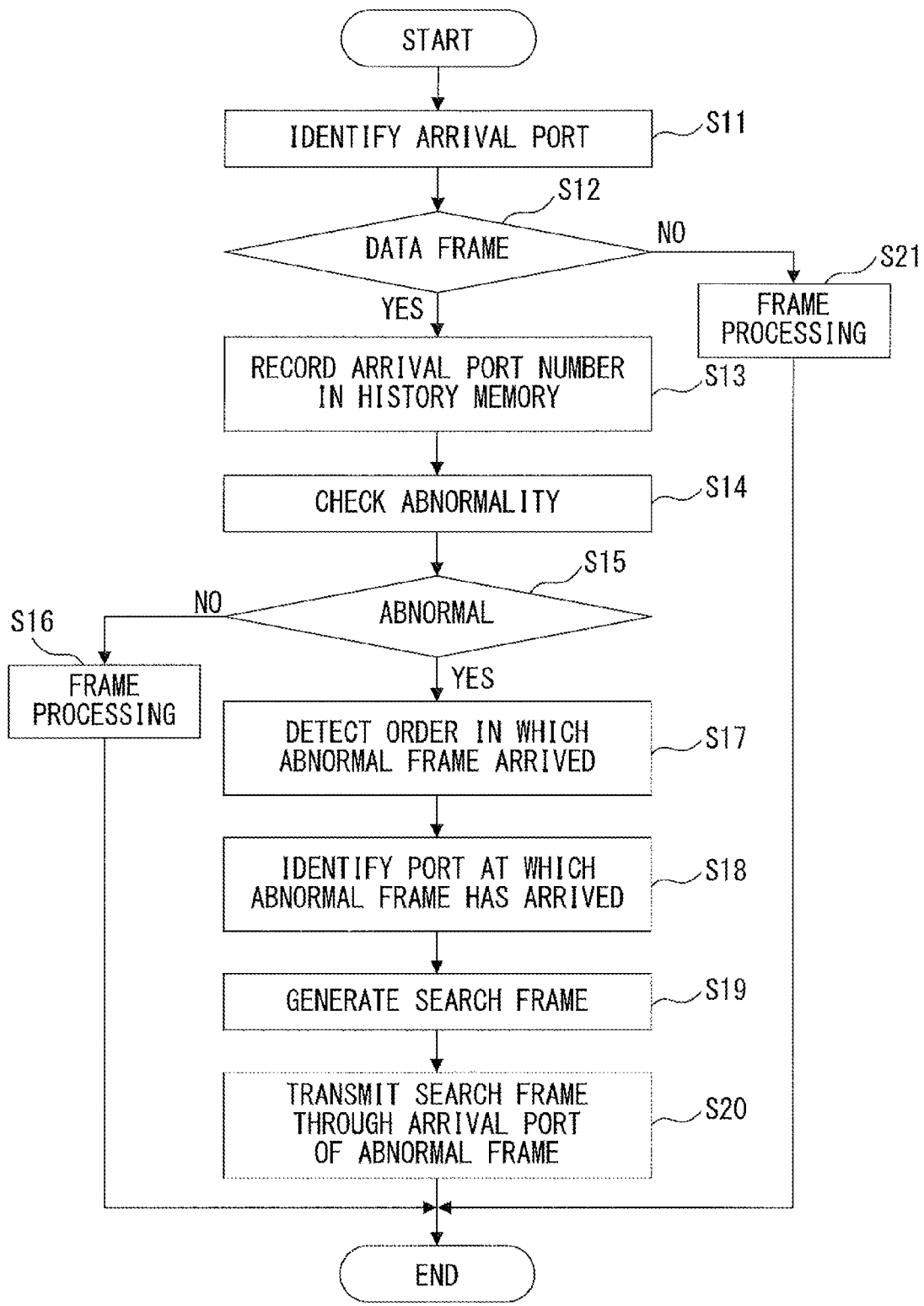
FIG. 12 is a flowchart that illustrates an operation of the gateway device that receives a frame.

In S1, the hub device 50 identifies a port at which a received frame has arrived. In S2, the hub device 50 decides whether the received frame is a data frame by checking the ID of the received frame. When the received frame is a data frame, in S3, the recorder 51 records, in the From history memory 61, an arrival port number that represents the port at which the frame has arrived. Then, in S4, the hub device 50 broadcasts the received data frame. On the other hand, when the received frame is not a data frame, in S5, the hub device 50 processes the frame according to the ID of the received frame. For example, when the hub device 50 receives a search frame, the searcher 52 identifies a port at which an abnormal frame has arrived, and the update unit 53 updates the search frame, as described with reference to FIG. 9. In addition, it is possible for the hub device 50 not to perform the checking only when an ID of a received frame indicates a search frame FIG. 12 is a flowchart that illustrates an operation of the gateway device 40 that receives a frame. Processing in the flowchart is performed every time a frame arrives at the gateway device 40.

S11-S13 are substantially the same as S1-S3 of FIG. 11. In other words, in the gateway device 40, when a received frame is a data frame, the recorder 44 records, in the From history memory 61, an arrival port number that represents a port at which the frame has arrived.

In S14 and S15, the detector 45 decides whether the received data frame is an abnormal frame. Here, for example, the detector 45 decides whether the received data frame is an abnormal frame by an ID check or a CRC operation. When the received data frame is not an abnormal frame, in S16, the gateway device 40 processes the frame according to the ID of the received frame. For example, the gateway device 40 transmits data stored in the received data frame to an outside network.

When the received data frame is an abnormal frame, in S17, the searcher 46 detects the order in which the abnormal frame arrived at the gateway device 40. For example, the searcher 46 detects how many frames there are in the past counting from the latest data frame to the abnormal frame. In the example of FIG. 6, "first previous with respect to the latest data frame" is obtained. Further, in S18, the searcher 46 identifies the port at which the abnormal frame has arrived. In this case, the searcher 46 identifies the port at which the abnormal frame has arrived by searching in the From history memory 61 by use of the order detected in S17.

In S19, the generator 47 generates a search frame. The data area of this search frame stores therein order information that indicates the order in which the abnormal frame arrived at the gateway device 40. The data area of this search frame also stores therein port information that indicates the port at which the abnormal frame has arrived in the gateway device 40. In S20, the transmitter 48 transmits the search frame through the port at which the abnormal frame has arrived. When the received frame is not a data frame, in S21, the gateway device 40 processes the received frame according to the ID of the frame. For example, when the gateway device 40 receives the search frame updated by the hub device 50, the source node identifying unit 49 performs processing of identifying the source node of the abnormal frame.

Figure 13:
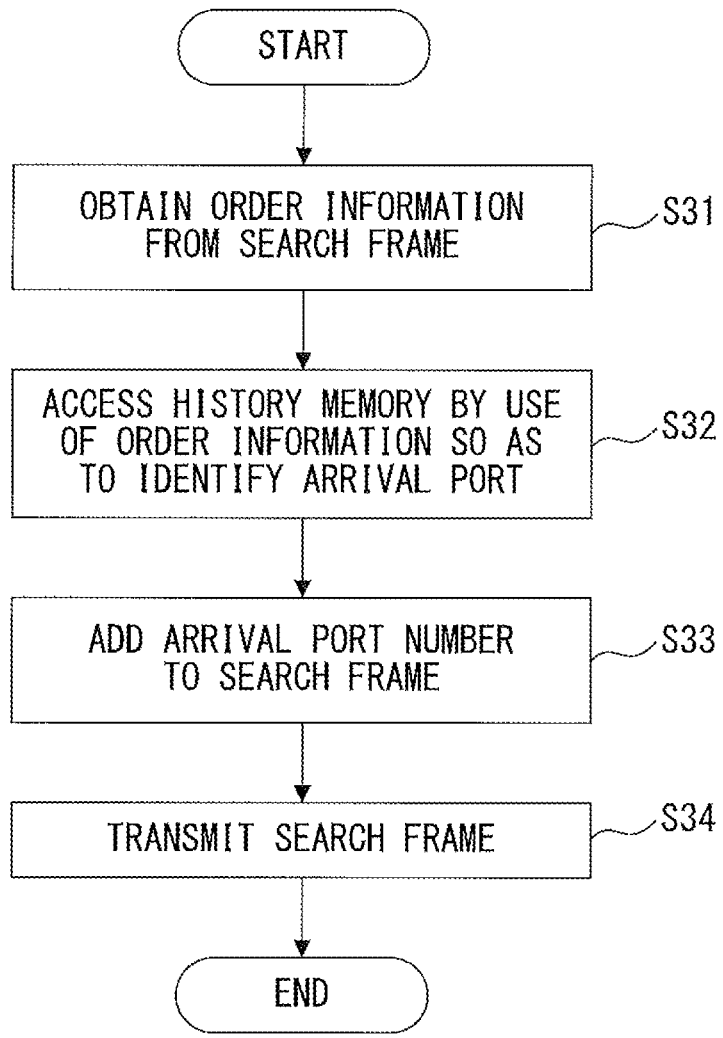
FIG. 13 is a flowchart that illustrates an operation of the hub device that receives a search frame.

FIG. 13 is a flowchart that illustrates an operation of the hub device 50 that receives a search frame. A search frame is generated by the gateway device 40. A hub device 50 receives the search frame from the gateway device 40 or another hub device 50.

In S31, the searcher 52 obtains order information from a received search frame. In S32, the searcher 52 identifies a port at which an abnormal frame has arrived by searching in the From history memory 61 by use of the order information obtained from the search frame. In S33, the update unit 53 adds, to the data area of the search frame, port information that indicates the port at which the abnormal frame has arrived. In S34, the transmitter 54 transmits the updated search frame to an upstream node and a node connected to the port at which the abnormal frame has arrived. When receiving the search frame from a downstream node, the hub device 50 forwards the search frame to the upstream node without updating it. In other words, the search frame transmitted from the hub device 50 to the upstream node is finally forwarded to the gateway device 40. Thus, it can be said that the hub device 50 transmits the updated search frame to the gateway device 40 and the node connected to the port at which the abnormal frame has arrived.

As described above, when receiving a search frame, the hub device 50 performs processing (1) to (3) below:
(1) Identifying, according to the order information stored in the search frame, a port at which an abnormal frame has arrived from among a plurality of ports of the hub device 50
(2) Adding, to the search frame, port information that indicates the port at which the abnormal frame has arrived
(3) Transmitting the search frame to which the port information has been added, to the gateway device 40 and a node connected to the port at which the abnormal frame has arrived.

The hub device 50 performs the processing (1) to (3) above when receiving a frame to which an ID value that represents the search frame has been added. Thus, the ID value that represents the search frame corresponds to a search instruction that requests another hub device to perform the processing (1) to (3) above.

Figure 14:
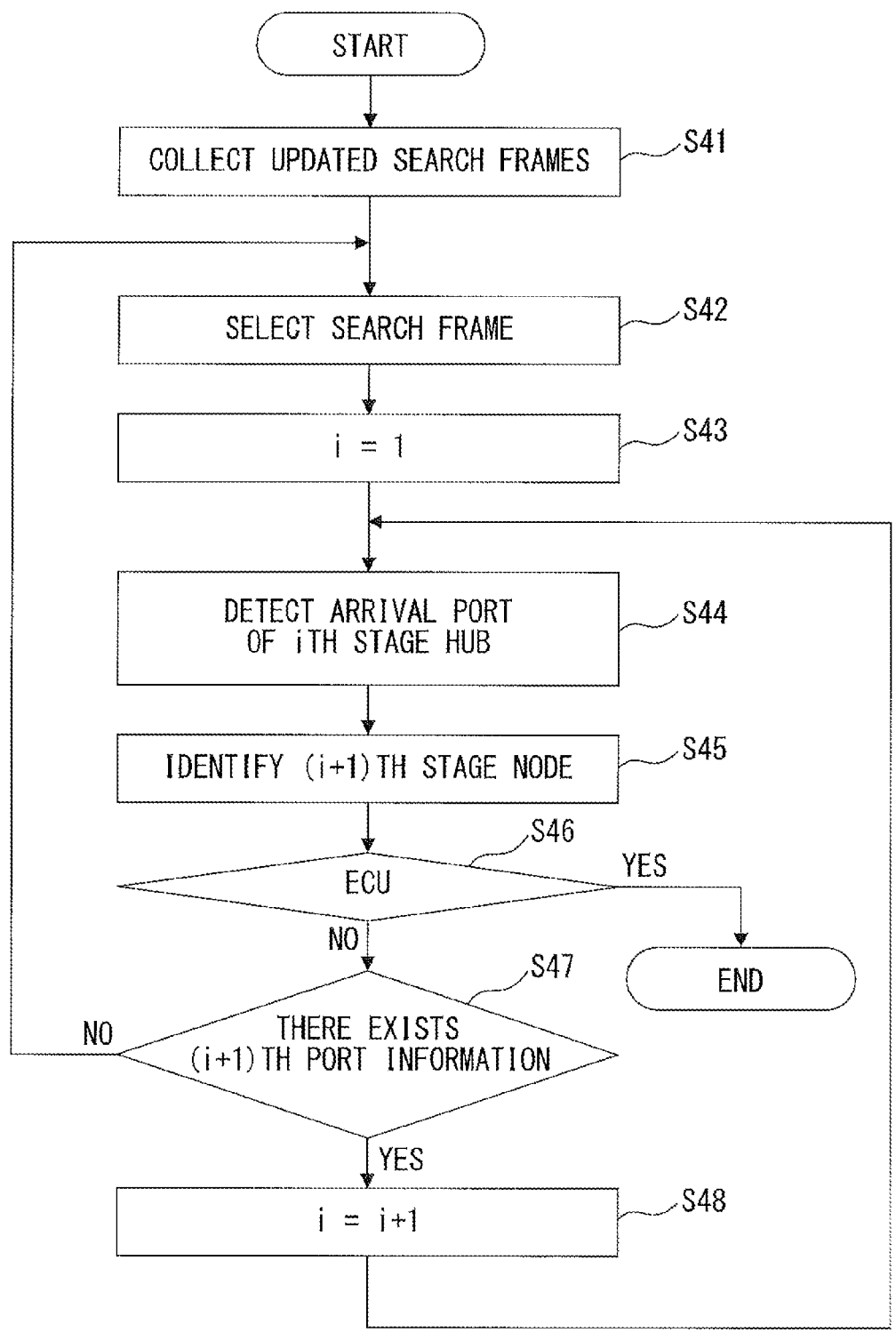
FIG. 14 is a flowchart that illustrates processing of identifying a source node of an abnormal frame.

FIG. 14 is a flowchart that illustrates processing of identifying a source node of an abnormal frame. This processing is performed by the source node identifying unit 49 after the gateway device 40 transmits a search frame to the hub device 50.

In S41, the source node identifying unit 49 collects search frames updated by the hub devices 50. In S42, the source node identifying unit 49 selects one of the collected search frames. In S43, the source node identifying unit 49 initializes a variable i. The variable i identifies port information stored in the data area of the selected search frame. A default of the variable i is one.

In S44, the source node identifying unit 49 obtains ith port information stored in the data area of the selected search frame. The ith port information indicates a port at which an abnormal frame has arrived in an ith stage HUB with respect to the gateway device 40. In S45, the source node identifying unit 49 identifies an (i+1)th node connected to the port detected in S44. In S46, the source node identifying unit 49 decides whether the node identified in S45 is an ECU. When the node identified in S45 is an ECU, the source node identifying unit 49 decides that the detected ECU is a source node of the abnormal frame.

When the node identified in S45 is not an ECU, in S47, the source node identifying unit 49 decides whether (i+1)th port information is stored in the data area of the selected search frame. When the (i+1)th port information is not stored in the data area of the selected search frame, the processing of the source node identifying unit 49 returns to S42. On the other hand, when the (i+1)th port information is stored in the data area of the selected search frame, in S48, the source node identifying unit 49 increments the variable i by one. After that, the processing of the source node identifying unit 49 returns to S44.

The processing of FIG. 14 will be described by use of the example of FIG. 6. It is assumed that the gateway device 40 receives the search frame of FIG. 10B and the search frame of FIG. 10C.

It is assumed that the source node identifying unit 49 selects the search frame of FIG. 10B from among the two collected search frames. In this case, the source node identifying unit 49 decides that a second stage node is the HUB 13 according to first port information (0x004) stored in this search frame. In other words, the process of S47 is performed because it is decided to be "No" in S46. However, as illustrated in FIG. 10B, this search frame does not include second port information. Thus, the processing of the source node identifying unit 49 returns to S42.

Next, the source node identifying unit 49 selects the search frame of FIG. 10C. In this case, the source node identifying unit 49 decides that the second stage node is the HUB 13 according to the first port information (0x004) stored in this search frame. In other words, the process of S47 is performed because it is decided to be "No" in S46. However, as illustrated in FIG. 10C, this search frame include second port information. Thus, the processing of the source node identifying unit 49 returns to S44 after the variable i is incremented from one to two.

The source node identifying unit 49 decides that a third stage node is the ECU 131 according to the second port information (0x002) stored in the search frame. In other words, "Yes" is obtained in S46. Thus, the source node identifying unit 49 can decide that the source node of the abnormal frame is the ECU 131.

In the example described above, the hub device 50 that received a search frame updates the search frame, and then transmits the updated search frame through a port at which an abnormal frame has arrived, but the first embodiment is not limited to this method. For example, the hub device 50 may broadcast the updated search frame. However, in that case, in order to prevent an unnecessary search frame from arriving at the gateway device 40, for example, the hub device 50 temporarily disconnects a signal line of a port other than the port at which the abnormal frame has arrived.

Further, procedures (1) to (4) below may be performed.
(1) A gateway transmits a search frame to a hub connected to an identified port.
(2) The hub that received the search frame stores, in the search frame, a port number identified by referring to its own From history memory 61, and transmits the search frame to another hub connected to the identified port.
(3) The procedure (2) above continues to be performed until the search frame reaches an ECU.
(4) The ECU that received a search frame transmits the search frame to an upstream device.

According to these procedures, it is sufficient if each hub has a relay function, and they do not have to have a transmission function.

Furthermore, procedures (1) to (4) below may be performed.

(1) A gateway transmits a search frame to a hub connected to an identified port.
(2) The hub that received the search frame stores, in the search frame, a port number identified by referring to its own From history memory 61, and broadcasts the search frame to downstream hubs. However, when the port is identified, communication with a hub connected to a port other than the identified port is disconnected. The search frame is also broadcasted to upstream hubs.
(3) The procedure (2) above continues to be performed until the search frame reaches an ECU.
(4) The gateway monitors the search frame transmitted by the procedures (2) and (3) above.

According to these procedures, it is sufficient if each hub has a relay function, a data inserting function, and a communication disconnecting function, and they do not have to have a transmission function.

As described above, according to the communication monitoring method of the first embodiment, each hub device 50 does not have to store therein a set of an ID and data of a received frame, and records an arrival port number by use of the From history memory 61. Here, it is assumed that the hub device 50 has four ports and records one thousand arrival port numbers for each port in the From history memory 61. Further, it is assumed that the arrival port number is represented by one byte. Thus, the following is the memory size of the From history memory 61:
1000×4×8=32000 bits
In other words, compared with a method for having stored a set of an ID and data of a received frame, the communication monitoring method of the first embodiment can reduce the size of a memory provided in each hub device for identifying a source node of an abnormal frame. Further, the communication monitoring method of the first embodiment does not need a hash function.

Second Embodiment

In the first embodiment, the From history memory 61 of the gateway device 40 may go out of synchronization with that of the hub device 50. For example, if the From history memory 61 of the hub device 50 has been already updated due to a next data frame when the gateway device 40 detects an abnormal frame and transmits a search frame to the hub device 50, the content of the From history memory 61 of the gateway device 40 is not consistent with that of the From history memory 61 of the hub device 50. In this case, a source node of the abnormal frame is not identified. A second embodiment of the present invention will solve the problem.

Figure 15:
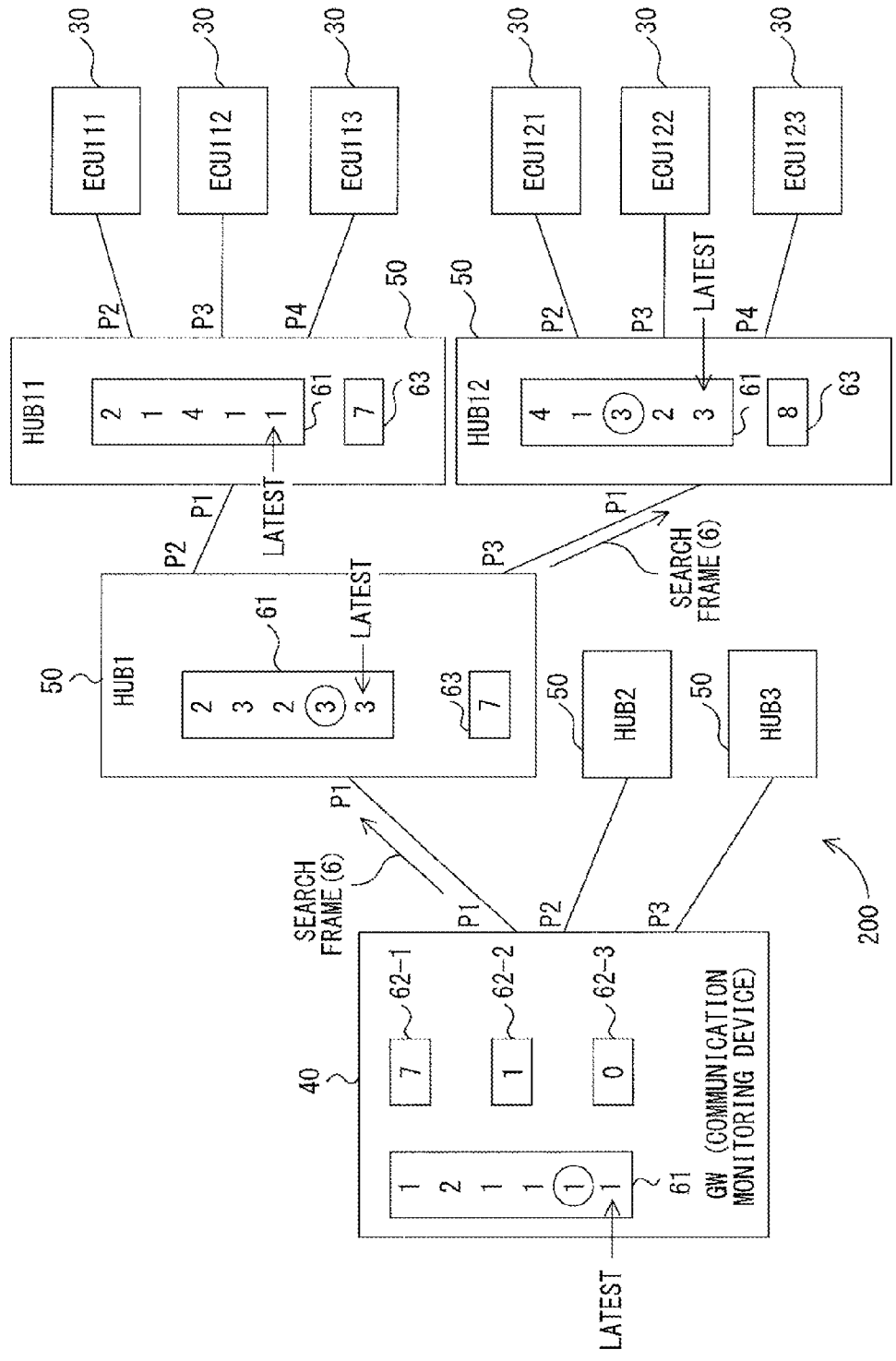
FIG. 15 illustrates an example of a communication monitoring method according to a second embodiment.

FIG. 15 illustrates an example of a communication monitoring method according to the second embodiment. In the example of FIG. 15, the gateway device 40 does not forward a data frame between the hub devices 50. In other words, the gateway device 40 does not forward a data frame received from the HUB 1 to the HUB 2 and the HUB 3. Likewise, the gateway device 40 does not forward a data frame received from the HUB 2 to the HUB 1 and the HUB 3. Moreover, the gateway device 40 does not forward a data frame received from the HUB 3 to the HUB 1 and the HUB 2.

However, a data frame is broadcasted in a subnetwork (the ECUs 111-113 and the ECUs 121-123) that are connected under the HUB 1. Likewise, with respect to a subnetwork that is connected under the HUB 2 and a subnetwork that is connected under the HUB 3, a data frame is broadcasted in each of the subnetworks. Note that the gateway device 40 can receive the data frame broadcasted in each subnetwork.

The gateway device 40 includes received frame counters 62-1 to 62-3. The received frame counter 62-1 counts the number of data frames received through the port P1 of the gateway device 40. In other words, the received frame counter 62-1 counts the number of data frames broadcasted in the subnetwork under the HUB 1. Likewise, the received frame counter 62-2 counts the number of data frames received through the port P2, and the received frame counter 62-3 counts the number of data frames received through the port P3.

The hub device 50 has a received frame counter 63. The received frame counter 63 counts the number of data frames received by the hub device 50.

In the example of FIG. 15, seven data frames are broadcasted in the subnetwork under the HUB 1, and the counter value of the received frame counter 62-1 of the gateway device 40 and the counter values of the received frame counters 63 of the HUB1 and the HUB 11 are "7". However, after that, a data frame transmitted from the ECU 122 arrives at the HUB 12 and the counter value of the received frame counter 63 of the HUB 12 has been updated from "7" to "8". In other words, an out of synchronization occurs between the From history memories 61.

When detecting an abnormal frame, the gateway device 40 identifies a port at which the abnormal frame has arrived by referring to the From history memory 61, as is the case with the first embodiment. In the example of FIG. 15, "arrival port: P1" and "order: first previous with respect to the latest data frame" are obtained.

Next, from among the arrival port numbers recorded after the arrival port number corresponding to the abnormal frame in the From history memory 61, the searcher 46 counts the number of arrival port numbers that are the same as the arrival port number corresponding to the abnormal frame. In the example of FIG. 15, the arrival port number corresponding to the abnormal frame is "1", and the number of "1" s recorded after the arrival port number corresponding to the abnormal frame is one. In the following description, this number may be referred to as the "number of subsequent frames".

The searcher 46 subtracts the number of subsequent frames from the counter value of a received frame counter corresponding to the port at which the abnormal frame has arrived. In the example of FIG. 15, "6" is obtained by subtracting the number of subsequent frames "1" from the counter value of the received frame counter 62-1 "7". The result of the subtraction indicates that "the sixth data frame counting from the data frame that arrived first is an abnormal frame". Thus, the gateway device 40 stores this value in a search frame as order information and transmits the search frame to a corresponding hub device 50 (the HUB 1 in FIG. 15).

In FIG. 15, a number added to a search frame transmitted from the gateway device 40 represents order information. In this example, "the sixth data frame with respect to the first data frame" is obtained as order information. Thus, "6" is added to the "search frame".

The hub device 50 that received the search frame searches in the From history memory 61 according to the difference between the counter value of the received frame counter 63 and the value of the order information in the received search frame. In the HUB 1 of FIG. 15, the difference between the counter value of the received frame counter 63 "7" and the order information "6" is "1". Then, the searcher 52 obtains an "arrival port number that is one arrival port number before the latest arrival port number" from the From history memory 61. As a result, it is decided that the abnormal frame has arrived at the port P3 of the HUB 1. Then, the HUB 1 transmits the search frame to the HUB 12 that is connected to the port P3.

In the HUB 12, the difference between the counter value of the received frame counter 63 "8" and the order information "6" is "2". Then, the searcher 52 obtains an "arrival port number that is two arrival port numbers before the latest arrival port number" from the From history memory 61. As a result, it is decided that the abnormal frame has arrived at the port P3 of the HUB 12.

The HUB 1 and the HUB 12 respectively transmit, to the gateway device 40, the search frame including port information that indicates the port at which the abnormal frame has arrived. Then, the gateway device 40 identifies the source node of the abnormal frame according to the updated search frames collected from hub devices 50, as is the case with the first embodiment. The method for identifying the source node of the abnormal frame from the updated search frames is substantially the same in the first and second embodiments.

Accordingly, in the second embodiment, a source node of an abnormal frame is identified even when synchronization is not established between the From history memories 61 of the gateway device 40 and the hub device 50. Compared with the first embodiment, the hub device 50 has the received frame counter 63 in the second embodiment. However, the size of a memory for realizing the received frame counter 63 is small. For example, 32 bits are allocated with respect to the received frame counter 63. In this case, $2^{32}$ received frames can be counted.

In the above-described example, a search frame stores therein order information that indicates "how many frames are there counting from the first data frame to the abnormal frame", but the second embodiment is not limited to this method. For example, it is assumed that the From history memories 61 of the gateway device 40 and the hub devices 50 are periodically initialized at the same time. In this case, a search frame may store therein order information that indicates "how many frames are there counting from when the From history memories 61 were initialized until the abnormal frame is detected". In other words, the order information in the second embodiment indicates an order in which an abnormal frame arrived with respect to a received frame that is specified in advance.

Figure 16:
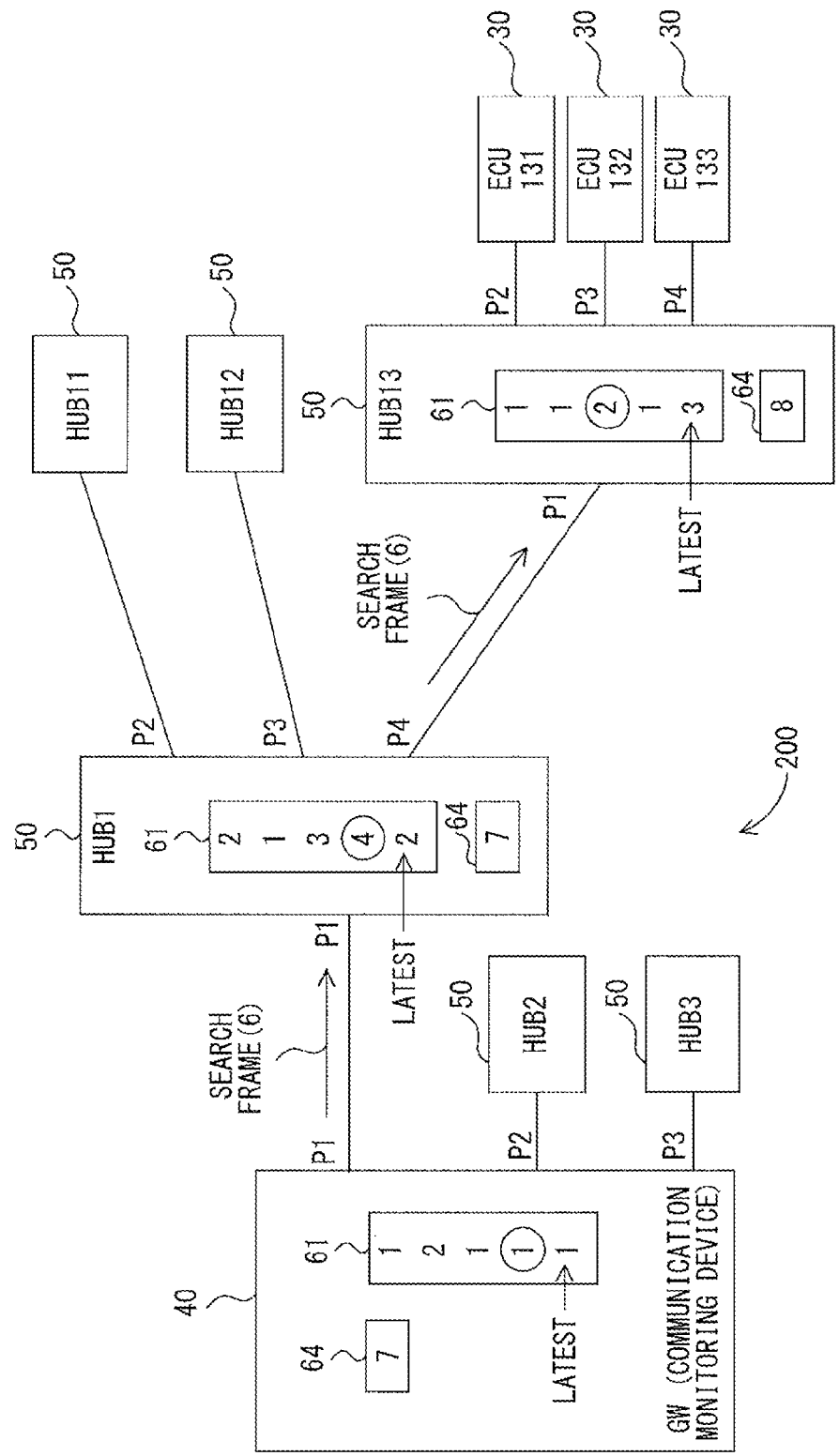
FIG. 16 illustrates a modification of the second embodiment.

FIG. 16 illustrates a modification of the second embodiment. In the example of FIG. 16, the gateway device 40 forwards a data frame between the hub devices 50. In other words, a data frame transmitted from a certain terminal device 30 is broadcasted to all terminal devices 30 in the network 200.

In this case, the gateway device 40 and the hub device 50 respectively have a received frame counter 64. The received frame counter 64 provided in the gateway device 40 counts the number of data frames that arrive at the gateway device 40. The received frame counter 64 provided in the hub device 50 counts the number of data frames that arrive at the hub device 50.

In the example of FIG. 16, the gateway device 40 decides that a data frame received one frame before the latest received frame is an abnormal frame. Thus, the gateway device 40 decides, by referring to the From history memories 61, that the port at which the abnormal frame has arrived is P1. Here, the counter value of the received frame counter 64 of the gateway device 40 is "7". Thus, the gateway device 40 transmits a search frame including "order information: 6 (the sixth from the beginning)" to the HUB 1.

In the HUB 1, the difference between the counter value of the received frame counter 64 "7" and the order information "6" is "1". In this case, the HUB 1 decides that the port at which the abnormal frame has arrived is the port P4 by obtaining an arrival port number that is one arrival port number before the latest arrival port number in the From history memory 61. Thus, the gateway device 40 transmits the search frame to the HUB 13. In the HUB 13, the difference between the counter value of the received frame counter 64 "8" and the order information "6" is "2". In this case, the HUB 13 decides that the port at which the abnormal frame has arrived is the port P2 by obtaining an arrival port number that is two arrival port numbers before the latest arrival port number in the From history memory 61. The method in which the gateway device 40 collects search frames updated by each hub devices 50 so as to identify a source node of an abnormal frame is substantially the same in the first and second embodiments.

Other Embodiment

In the above-described examples, the hub device 50 transmits an updated search frame to the gateway device 40, but the embodiments of the present invention are not limited to this method. For example, by use of a dedicated line that is provided aside from the line for the network 200, the hub device 50 that received a search frame may report, to the gateway device 40, port information that indicates a port at which an abnormal frame has arrived.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication monitoring device used in a network that includes a plurality of nodes, the communication monitoring device comprising:
    a plurality of ports;
    a history memory that records therein arrival port identifiers, each of the arrival port identifiers indicating a port at which a data frame has arrived, in the order of arrival of the data frames; and
    a processor configured to execute a procedure including:
        adding, when a data frame arrives at the communication monitoring device, an arrival port identifier that indicates a port at which the data frame has arrived to the history memory,
        detecting, when the data frame is an abnormal frame, an order in which the abnormal frame arrived among received data frames that have arrived at any of the plurality of ports,
        deciding a first arrival port at which the abnormal frame has arrived by searching the history memory using the detected order,
        generating a search frame including order information that indicates the detected order and a search instruction that instructs to search for a source node of the abnormal frame,
        transmitting the search frame to a node connected to the first arrival port, wherein
    the search instruction requests the node that receives the search frame to perform a process of identifying, according to the order information stored in the search frame, a second arrival port at which the abnormal frame has arrived from among a plurality of ports provided in the node that receives the search frame, a process of adding port information that indicates the second arrival port to the search frame, and a process of transmitting the search frame to which the port information is added to the communication monitoring device and a node connected to the second arrival port, and
    the processor identifies the source node of the abnormal frame according to the port information added to the search frame when the communication monitoring device receives the search frame.

2. The communication monitoring device according to claim 1, wherein
    the order information indicates an order in which the abnormal frame arrived with respect to a latest received frame.

3. The communication monitoring device according to claim 1, wherein
    the order information indicates an order in which the abnormal frame arrived with respect to a received frame that is specified in advance.

4. A non-transitory computer-readable recording medium having stored therein a communication monitoring program for causing a processor to execute a communication monitoring process, the processor being provided in a communication monitoring device that has a plurality of ports and that is used in a network including a plurality of nodes, the process comprising:
    adding, when a data frame arrives at the communication monitoring device, an arrival port identifier that indicates a port at which the data frame has arrived to the history memory that records therein arrival port identifiers, each of the arrival port identifiers indicating a port at which a data frame has arrived, in the order of arrival of the data frames;
    detecting, when the data frame is an abnormal frame, an order in which the abnormal frame arrived among received data frames that have arrived at any of the plurality of ports;
    deciding a first arrival port at which the abnormal frame has arrived by searching the history memory using the detected order;
    generating a search frame including order information that indicates the detected order and a search instruction that instructs to search for a source node of the abnormal frame; and
    transmitting the search frame to a node connected to the first arrival port, wherein
    the search instruction requests the node that receives the search frame to perform a process of identifying, according to the order information stored in the search frame, a second arrival port at which the abnormal frame has arrived from among a plurality of ports provided in the node that receives the search frame, a process of adding port information that indicates the second arrival port to the search frame, and a process of transmitting the search frame to which the port information is added to the communication monitoring device and a node connected to the second arrival port, and the process further includes identifying the source node of the abnormal frame according to the port information added to the search frame when the communication monitoring device receives the search frame.

5. A communication monitoring method used in a network that includes a plurality of terminal devices, a plurality of hub devices that relay a data frame between the plurality of terminal devices, and a communication monitoring device that monitors communication performed by the plurality of terminal devices, wherein the communication monitoring device and the plurality of hub devices respectively have a history memory that records therein arrival port identifiers, each of the arrival port identifiers indicating a port at which a frame has arrived, in the order of arrival of data frames, the communication monitoring device detects an abnormal frame from among the data frames that have arrived at the communication monitoring device, the communication monitoring device detects an order in which the abnormal frame arrived, and identifies a first arrival port at which the abnormal frame has arrived at the communication monitoring device by referring to the history memory provided in the communication monitoring device using the detected order, the communication monitoring device transmits a search frame including order information that indicates the detected order to a node connected to the first arrival port, a hub device that receives the search frame refers to the history memory of the hub device according to the order information included in the search frame to identify a second arrival port at which the abnormal frame has arrived at the hub device, the hub device that receives the search frame adds port information that indicates the second arrival port to the search frame, and transmits the search frame to the communication monitoring device, and the communication monitoring device identifies a source node of the abnormal frame according to the port information included in the search frame to which the port information has been added.

* * * * *